United States Patent
Pittman

(10) Patent No.: US 8,484,365 B1
(45) Date of Patent: Jul. 9, 2013

(54) SYSTEM AND METHOD FOR PROVIDING A UNIFIED ISCSI TARGET WITH A PLURALITY OF LOOSELY COUPLED ISCSI FRONT ENDS

(75) Inventor: Joseph C. Pittman, Apex, NC (US)

(73) Assignee: NetApp, Inc., Sunnyvale, CA (US)

(*) Notice: Subject to any disclaimer, the term of this patent is extended or adjusted under 35 U.S.C. 154(b) by 1018 days.

(21) Appl. No.: 11/254,397

(22) Filed: Oct. 20, 2005

(51) Int. Cl.
- *G06F 15/16* (2006.01)
- *G06F 15/177* (2006.01)
- *G06F 15/173* (2006.01)

(52) U.S. Cl.
USPC .......... 709/230; 709/220; 709/221; 709/223; 709/224; 709/226

(58) Field of Classification Search
USPC .............. 709/230, 220, 221, 223, 224, 226
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,892,955 A | 4/1999 | Ofer | |
| 5,894,588 A | 4/1999 | Kawashima et al. | |
| 5,931,918 A | 8/1999 | Row et al. | |
| 5,941,972 A | 8/1999 | Hoese et al. | |
| 5,963,962 A | 10/1999 | Hitz et al. | |
| 5,975,738 A | 11/1999 | DeKoning et al. | |
| 6,038,570 A | 3/2000 | Hitz et al. | |
| 6,065,037 A | 5/2000 | Hitz et al. | |
| 6,128,734 A | 10/2000 | Gross et al. | |
| 6,425,035 B2 | 7/2002 | Hoese et al. | |
| 6,654,902 B1 | 11/2003 | Brunelle et al. | |
| 6,671,773 B2 | 12/2003 | Kazar et al. | |
| 6,708,265 B1 | 3/2004 | Black | |
| 6,757,695 B1 | 6/2004 | Noveck et al. | |
| 6,760,304 B2 | 7/2004 | Uzrad-Nali et al. | |
| 7,260,678 B1 | 8/2007 | Agarwal et al. | |
| 7,281,062 B1* | 10/2007 | Kuik et al. | 709/249 |
| 7,296,068 B1 | 11/2007 | Sarma et al. | |
| 7,305,462 B2* | 12/2007 | Nakamura et al. | 709/223 |
| 7,409,494 B2 | 8/2008 | Edwards et al. | |
| 7,523,201 B2 | 4/2009 | Lee et al. | |
| 2001/0020254 A1* | 9/2001 | Blumenau et al. | 709/229 |
| 2002/0099914 A1 | 7/2002 | Matsunami et al. | |
| 2003/0061399 A1* | 3/2003 | Wagener et al. | 709/321 |
| 2003/0061491 A1 | 3/2003 | Jaskiewicz et al. | |

(Continued)

OTHER PUBLICATIONS

American National Standards Institute, Inc.; American National Standard for Information Technology; Fibre Channel—Physical Signaling Interface (FC-PH); Nov. 14, 1994.

(Continued)

*Primary Examiner* — Thu Nguyen
*Assistant Examiner* — Joseph Greene
(74) *Attorney, Agent, or Firm* — Cesari and McKenna, LLP

(57) ABSTRACT

A system and method provides a unified iSCSI target using a plurality of loosely coupled iSCSI front ends. A cluster comprising a number of network elements and disk elements exports one or more logical units to iSCSI initiators. Each of the network elements is operatively interconnected with a replicated database which is utilized to share initiator data structures and lun mapping information. An iSCSI initiator may communicate with any of the network elements to access any of the logical units exported by the cluster.

32 Claims, 17 Drawing Sheets

U.S. PATENT DOCUMENTS

| | | | |
|---|---|---|---|
| 2003/0097611 | A1 | 5/2003 | Delaney et al. |
| 2003/0115350 | A1 | 6/2003 | Uzrad-Nali et al. |
| 2003/0120743 | A1 | 6/2003 | Coatney et al. |
| 2004/0064815 | A1 | 4/2004 | Uzrad-Nali et al. |
| 2004/0139167 | A1 | 7/2004 | Edsall et al. |
| 2004/0156393 | A1 | 8/2004 | Gupta et al. |
| 2004/0268017 | A1 | 12/2004 | Uzrad-Nali et al. |
| 2005/0192932 | A1* | 9/2005 | Kazar et al. ............... 707/1 |
| 2006/0107010 | A1* | 5/2006 | Hirezaki et al. ........... 711/165 |
| 2006/0248047 | A1* | 11/2006 | Grier et al. ............... 707/2 |
| 2006/0248379 | A1* | 11/2006 | Jernigan, IV ............ 714/6 |
| 2006/0277383 | A1* | 12/2006 | Hayden et al. ........... 711/170 |
| 2007/0022314 | A1* | 1/2007 | Erasani et al. ........... 714/4 |

OTHER PUBLICATIONS

American National Standards Institute, Inc.; American National Standard for Information Technology—Fibre Channel Arbitrated Loop (FC-AL-2); Dec. 8, 1999.

SNIA Storage Networking Industry Association; Common Internet File System (CIFS), Version: CIFS—Spec. 0.9. Work Group in Progress.

Fibre Channel Generic Services—3 (FC-GS-3), Revision 6.0; NCITS Working Draft Proposed American National Standard for Information Technology; Nov. 24, 1999.

Draft Proposed American National Standard for Information Systems—SCSI-3 Primary Commands; Mar. 28, 1997.

New Identifier Formats Based on IEEE Registration; http://standards.ieee.org/regauth/oui/tutorials/fibreformat.html; Accessed on Aug. 6, 2001.

Soltis S et al. "The Design and Performance of a Shared Disk File System for IRIX" NASA Goddard Space Flight Center Conference on Mass Storage and Technologies in Cooperation with the IEEE Symposium on Mass Storage Systems, Mar. 23, 1998, pp. 1-17, XP002194621.

Hu Yoshida: "LUN Security Considerations for Storage Area Networks" Hitachi Data Systems, 1999, pp. 1-7, XP002185193.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

\* cited by examiner

SYSTEM AND METHOD FOR PROVIDING A UNIFIED ISCSI TARGET WITH A PLURALITY OF LOOSELY COUPLED ISCSI FRONT ENDS

FIELD OF THE INVENTION

The present invention relates to storage systems and, more particularly, to providing a unified iSCSI target using a plurality of storage system front ends.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). RAID implementations enhance the reliability/integrity of data storage through the redundant writing of data "stripes" across a given number of physical disks in the RAID group, and the appropriate storing of redundant information (parity) with respect to the striped data. As described herein, a volume typically comprises at least one data disk and one associated parity disk (or possibly data/parity partitions in a single disk) arranged according to a RAID 4 or equivalent high-reliability implementation. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of data containers, such as files and blocks. For example, each "on-disk" file may be implemented as a set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network. In the case of block-based protocol packets, the client requests (and storage system responses) address the information in terms of block addressing on disk using, e.g., a logical unit number (lun). These block-base protocol packets may comprise SCSI encapsulated in TCP/IP (iSCSI).

In such block-based storage system environments, the luns exported by a storage system are only available by accessing that particular system. It should be noted that the term "lun" as used herein may refer to a logical unit number and/or a logical unit. A noted disadvantage of such environments arises when the storage system suffers an error or otherwise becomes inaccessible due to, e.g., a failure in network connectivity. As luns are only available by accessing the storage system, those luns become inaccessible should the storage system become inaccessible. Such inaccessibility is unacceptable for many users of SANs who require high, e.g., "24×7" data availability.

To improve the availability of luns, storage systems may be coupled together in a cluster with the property that when one storage system fails the other begins servicing data access requests directed to the failed storage system's luns. In such an environment, two storage systems are coupled to form a storage system cluster. Each storage system services data access requests directed to its luns and only services data access requests directed to the other storage system's luns after a failover operation has occurred. During the failover operation, the surviving storage system assumes the identity of the failed storage system by, for example, assigning the failed storage system's Internet Protocol (IP) addresses to network adapters available on the surviving storage system. However, a noted disadvantage of such clusters is that they are limited to two storage systems.

Another noted disadvantage of such clusters is that data access requests directed to a lun may only be serviced by one storage system at any given point in time. Thus, if numerous data access requests are directed to a first storage system in a cluster, the second storage system may sit idle while the first storage system is consumed with data access requests. While the disk subsystem of the first storage system may be able to process and/or retrieve information associated with the data access requests, it is possible that the network protocol stacks on the first storage system may become overwhelmed so that initiators may need to throttle their data access requests.

SUMMARY OF THE INVENTION

The disadvantages of the prior art are overcome by providing a system and method for configuring a cluster of interconnected storage systems as an iSCSI unified target. Illustratively, each storage system of the cluster comprises one or more network elements (N-module) and disk elements (D-module) operatively interconnected by a cluster switching fabric. The present invention permits the cluster to be presented to an initiator (client) as an iSCSI target by encoding each N-module to function as one of a plurality of "front ends" of the iSCSI target. As a front end, any N-module may cooperate with clients to open (establish) one or more iSCSI sessions and thereafter receive data access requests directed to the iSCSI unified target. A data access request received by an N-module is forwarded from that module to an appropriate D-module of the cluster for processing.

A management module (M-module) is operatively interconnected with the cluster to provide a set of user interface tools that enable an administrator to create appropriate logical unit number (lun) maps, create and/or destroy luns and to perform other lun management functions. A replicated database (RDB), executes as a user application on each storage system and interfaces with a lun configuration process to centralize configuration of luns within the cluster. Modifications to the lun configuration are stored within the RDB. The RDB alerts each N-module of a change, which causes the N-module to retrieve the changed information from the RDB and update its local configuration.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
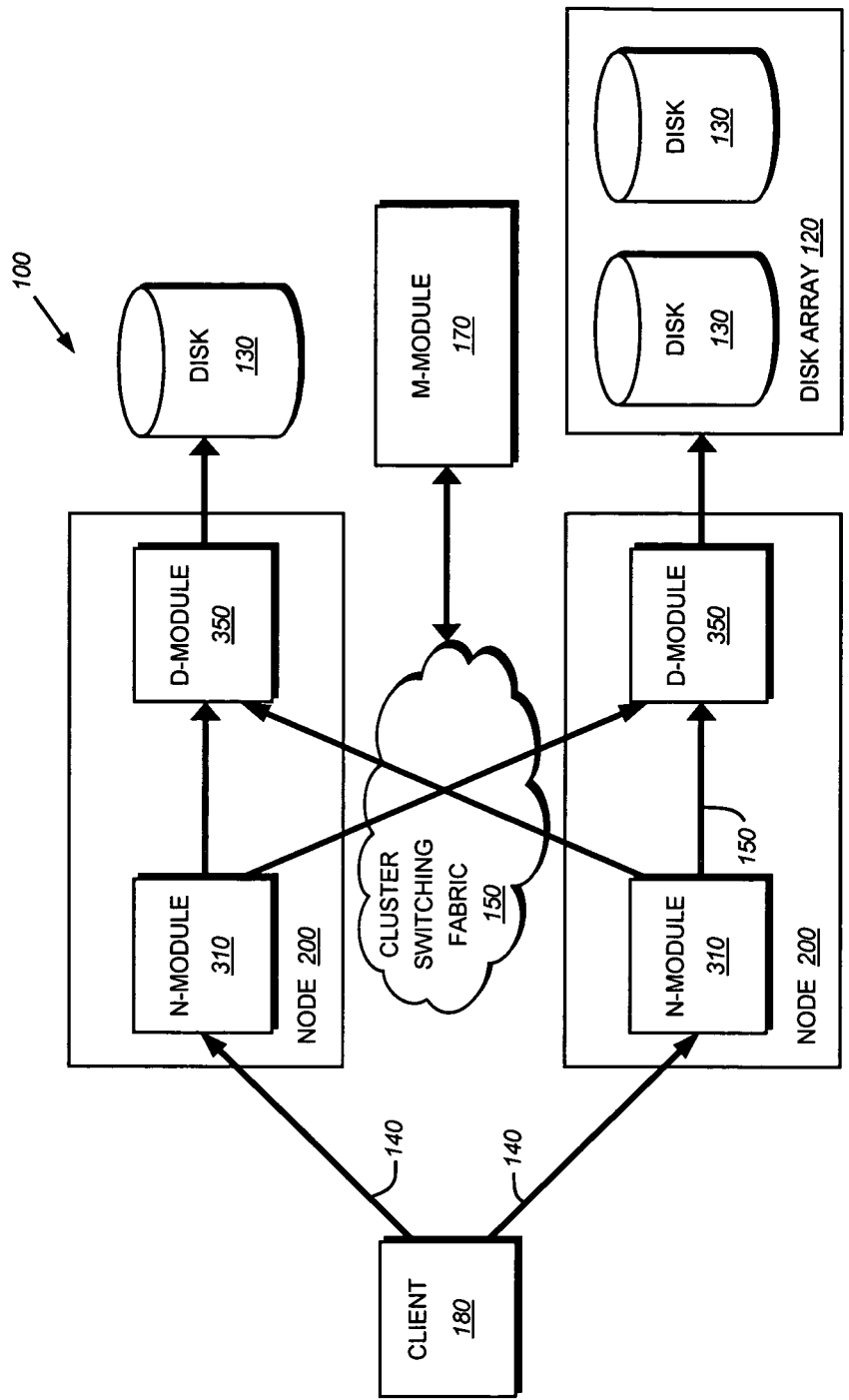
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002, now issued as U.S. Pat. No. 6,671,773 on Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Also interconnected with the cluster switching fabric 150 is a management module (M-module) 170. The M-module 170 executes various user interface (UI) and management functions for the cluster. Illustratively, the M-module 170 processes commands entered by an administrator for creating and maintaining logical unit number (lun) configuration information in accordance with the illustrative embodiment of the present invention.

B. Storage System Node

Figure 2:
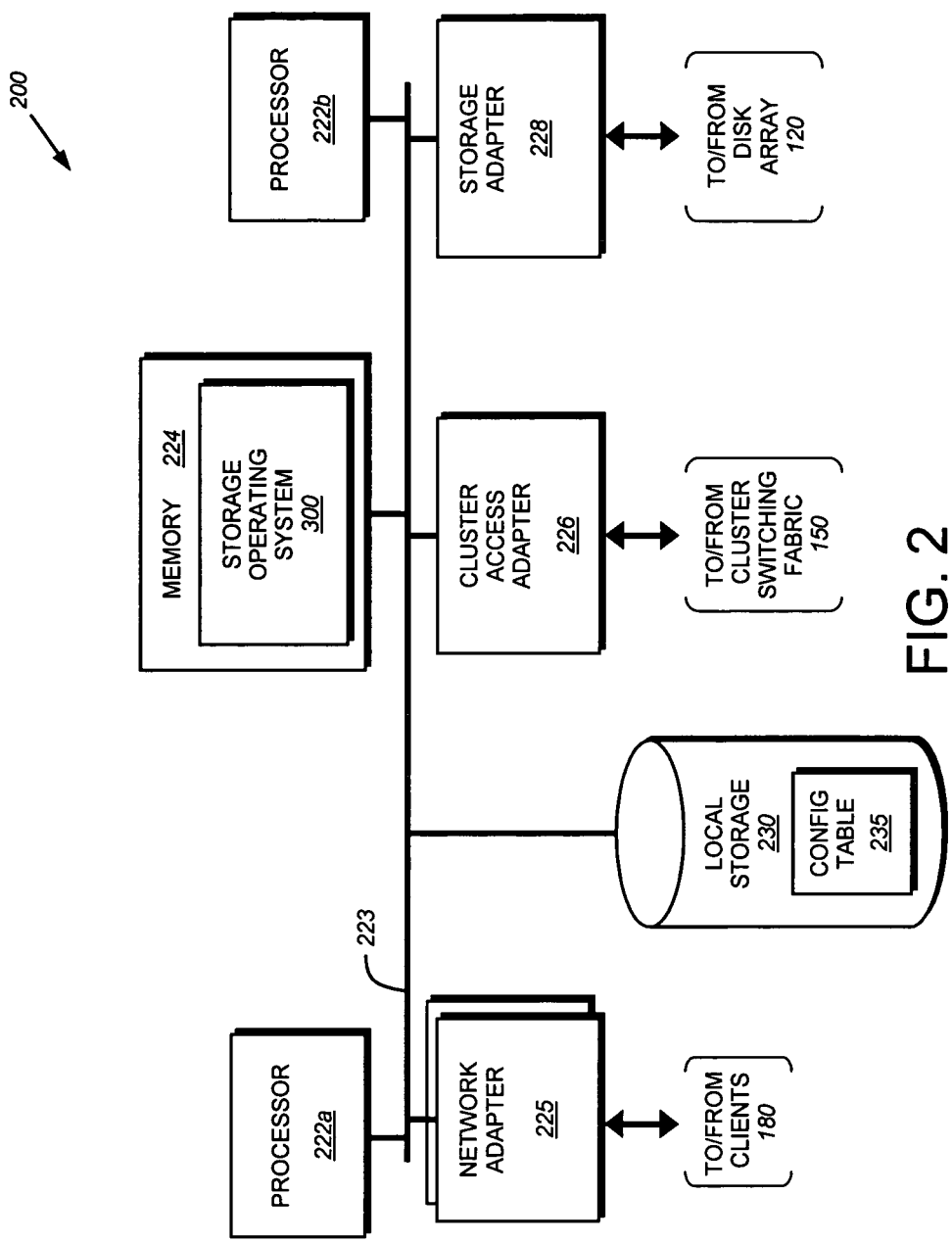
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The network adapter 225 may comprise a conventional network interface controller (NIC) or may, in alternate embodiments, comprise a TCP/IP offload engine (TOE) and/ or an iSCSI target host bus adapter (HBA), each of which may provide a level of acceleration for use with the iSCSI protocol. In alternate embodiments, there may be a plurality of network adapters, each of which may accept iSCSI connections.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 3:
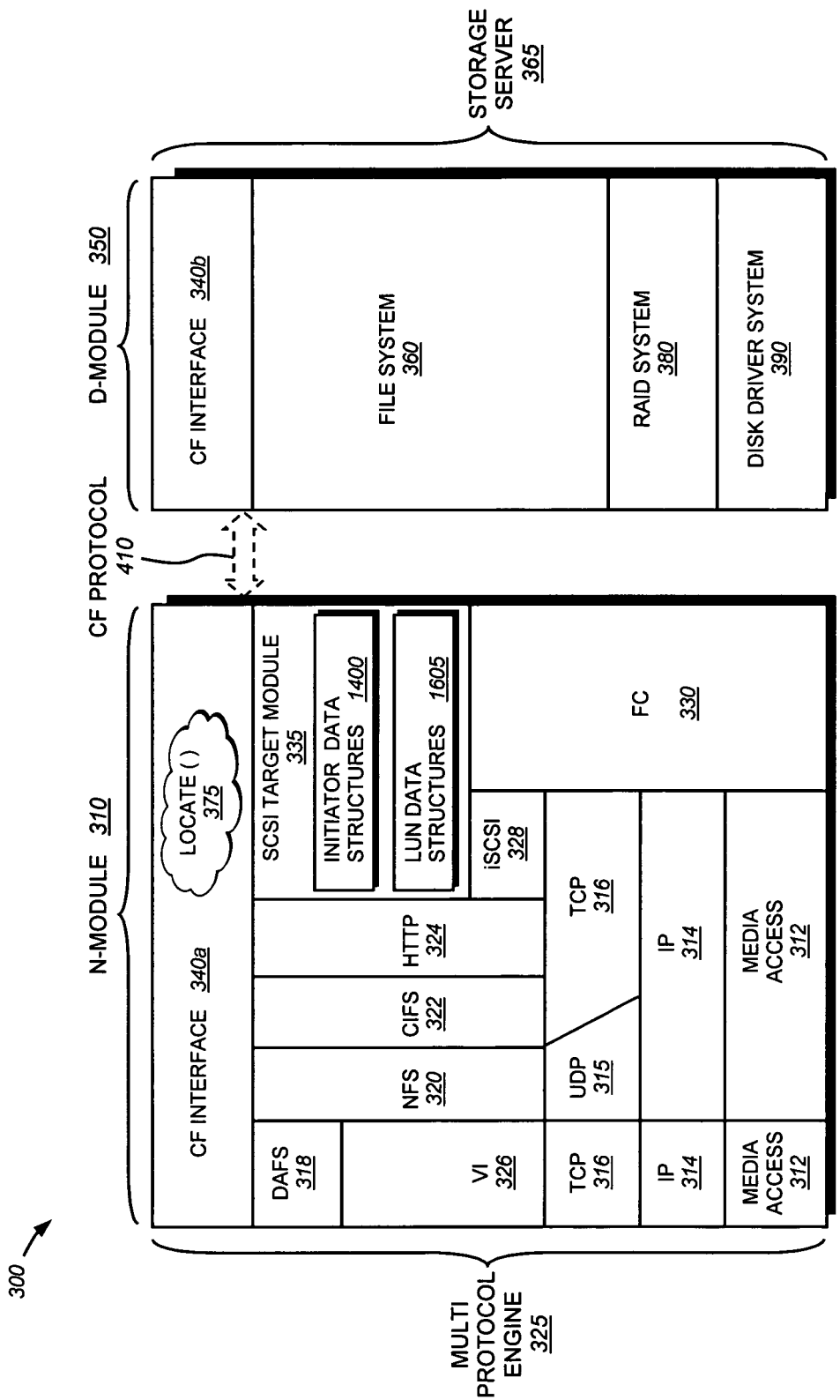
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the logical unit space and the file system space, where logical units are represented as named objects within the file system space.

Illustratively, the SCSI target module 335 includes a number of initiator data structures 1400 and/or lun data structures 1605. As described further below, an initiator data structure 1400 is generated for each iSCSI initiator that logs into the N-module. The initiator data structure 1400 contains various data associated with the initiator. Similarly, a lun data structure 1605 is associated with each lun exported by the storage system and as described further below, is utilized to store various metadata related to the luns. Initiator data structures and lun data structures are further described in U.S. patent application Ser. No. 10/619,122 entitled, SYSTEM AND METHOD FOR OPTIMIZED LUN MASKING, by Herman Lee, et al., now issued as U.S. Pat. No. 7,523,201 on Apr. 21, 2009, which is hereby incorporated by reference.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, including D-module-to-D-module communication.

The protocol layers, e.g., the NFS/CIFS layers and the iSCSI/FC layers in conjunction with the SCSI target layer, of the N-module 310 function as protocol servers that translate file-based and block based data access requests from clients. As part of the processing of these requests, the N-module may have to request data services from the D-Module 350. This may be achieved via file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. A data access request received by an N-Module is processed by that N-Module. As part of the processing, the N-module may have to send requests to one or more D-modules. A Locate( ) function 375 is illustratively implemented within CF interface 340a. The Locate( ) function 375 interfaces with a volume location database, described further below, to identify the proper D-module to which a data access request should be forwarded. Generally, the Locate( ) function 375 identifies the D-module that is currently serving the volume to which the data access request is directed.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol is the SpinFS protocol available from Network Appliance, Inc. The SpinFS protocol is described in the above-referenced U.S. Pat. No. 6,671,773.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 4:
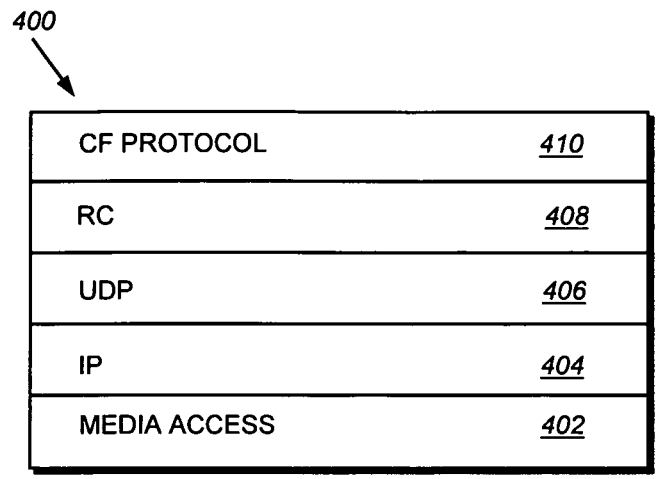
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
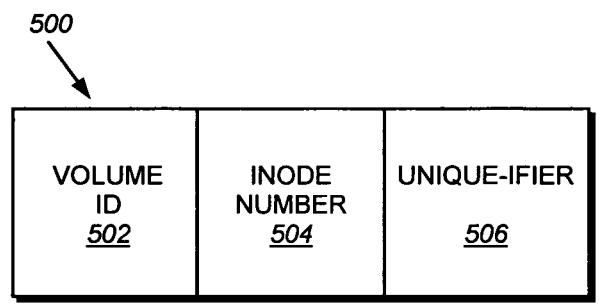
FIG. 5 is a schematic block diagram illustrating the format of a data container handle in accordance with an embodiment of the present invention.

A data container, e.g., a file or logical unit, is accessed in the file system using a data container handle. FIG. 5 is a schematic block diagram illustrating the format of a data container handle 500 including a volume ID field 502, an inode number field 504 and a unique-ifier field 506. The volume ID field 502 contains a global identifier (within the cluster 100) of the volume within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields.

E. File System Organization

Figure 6:
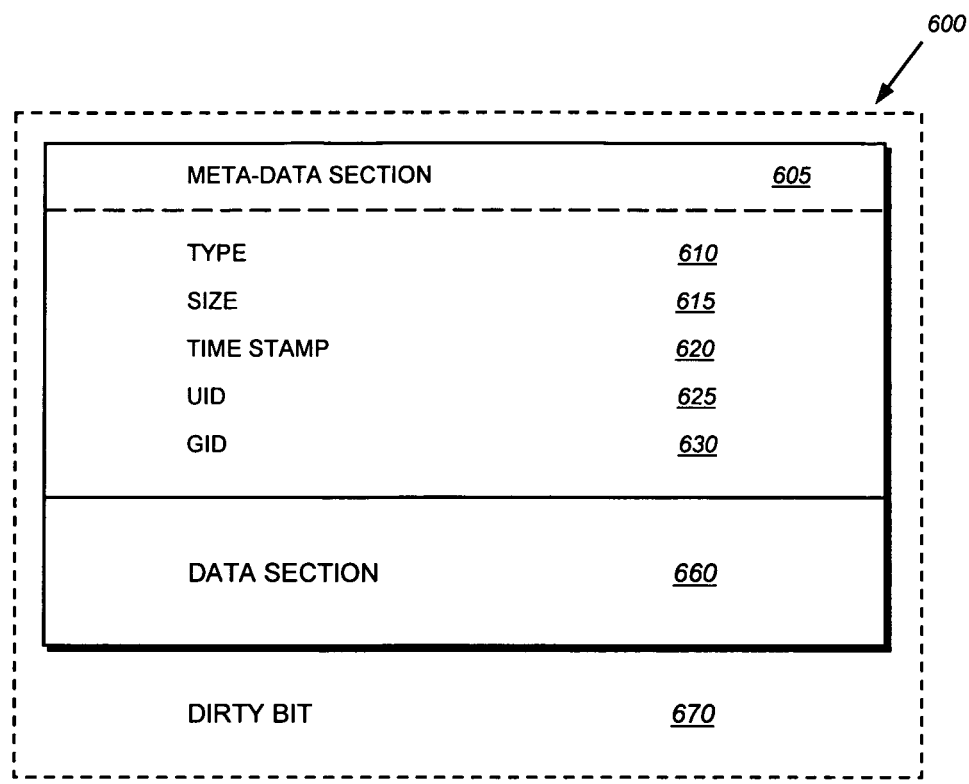
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 660 of the inode (e.g., a second level inode) references an indirect block (e.g., a first level L1 block) that contains 1024 pointers, each of which references a 4 KB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, contains 1024 pointers, each of which references a 4 KB data block on disk. When accessing a data container (e.g., file or logical unit), each block of the data container may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819, 292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
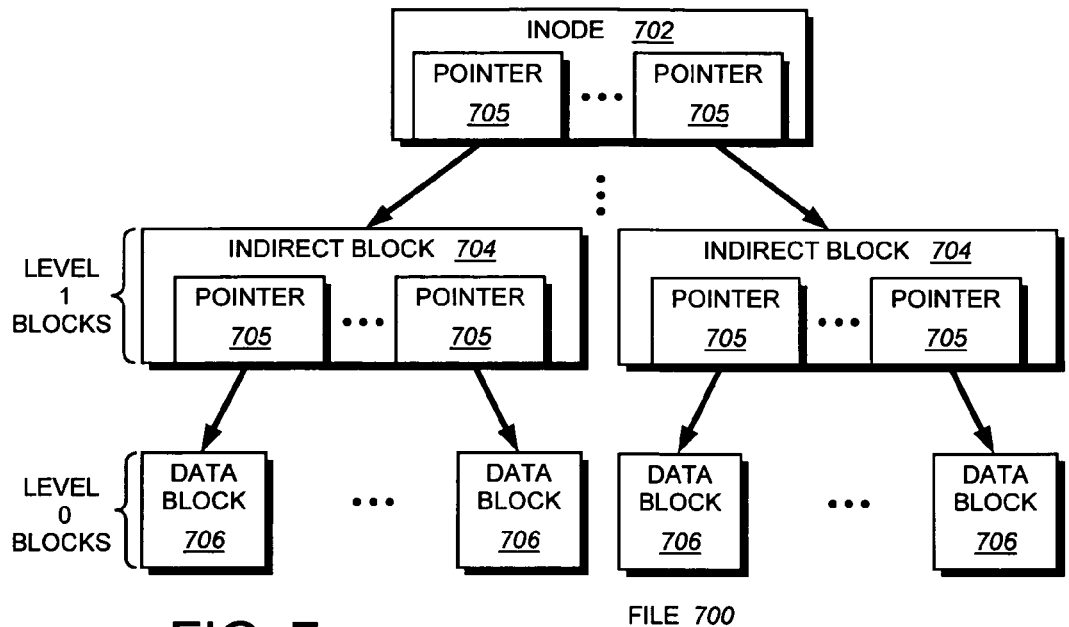
FIG. 7 is a schematic block diagram of an exemplary buffer tree in accordance with an embodiment of the present invention.

FIG. 7 is a schematic block diagram of an embodiment of a buffer tree of a file or logical unit that may be advantageously used with the present invention. The buffer tree is an internal representation of blocks for a data container (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc. now issued as U.S. Pat. No. 7,409,494 on Aug. 5, 2008. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
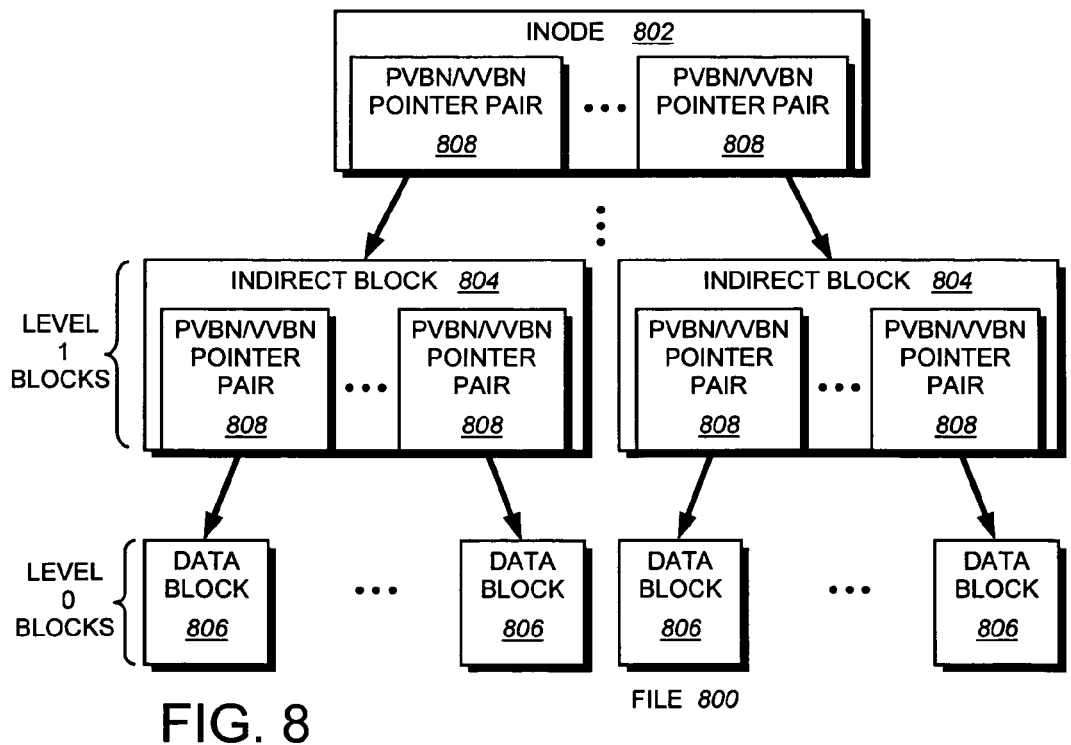
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
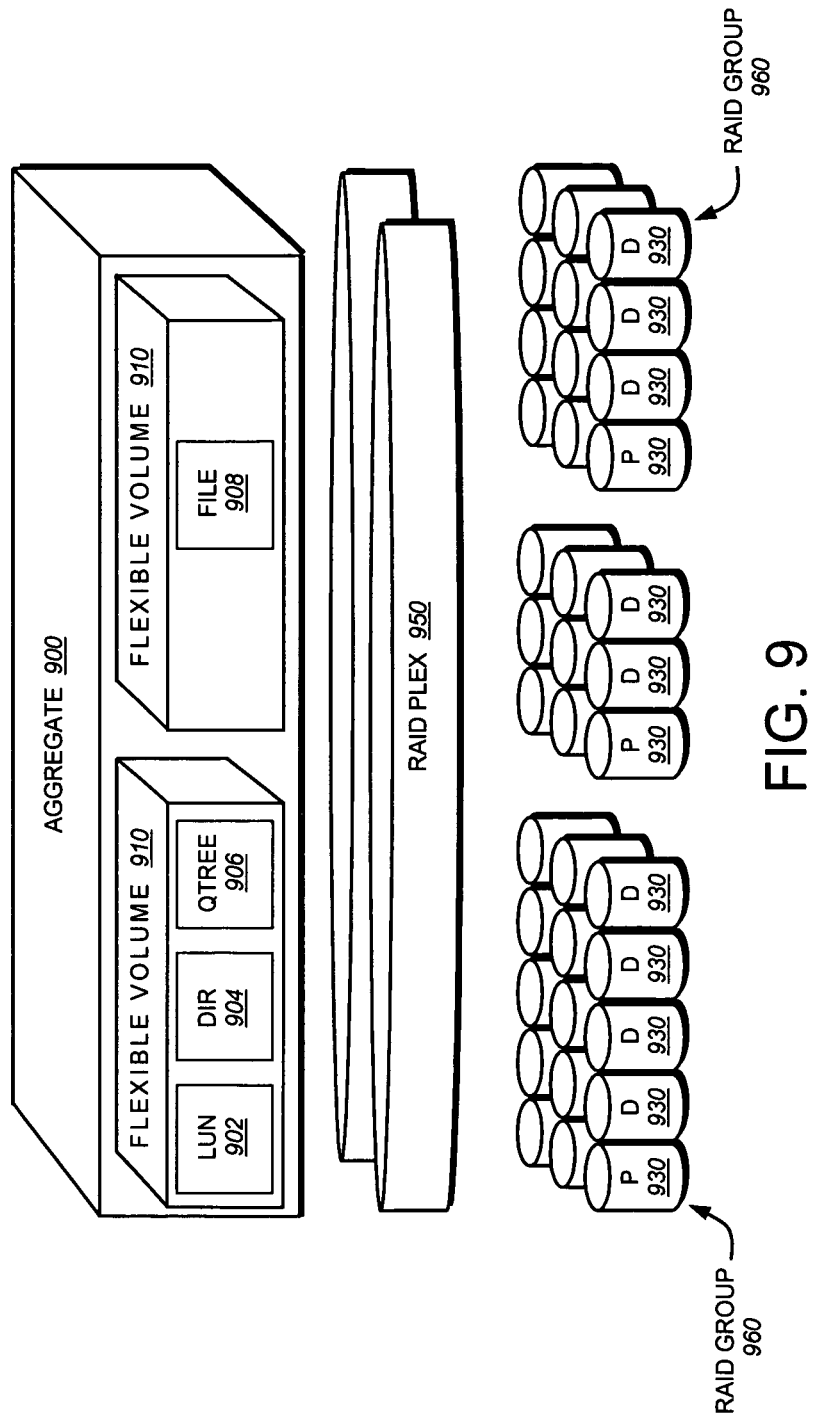
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
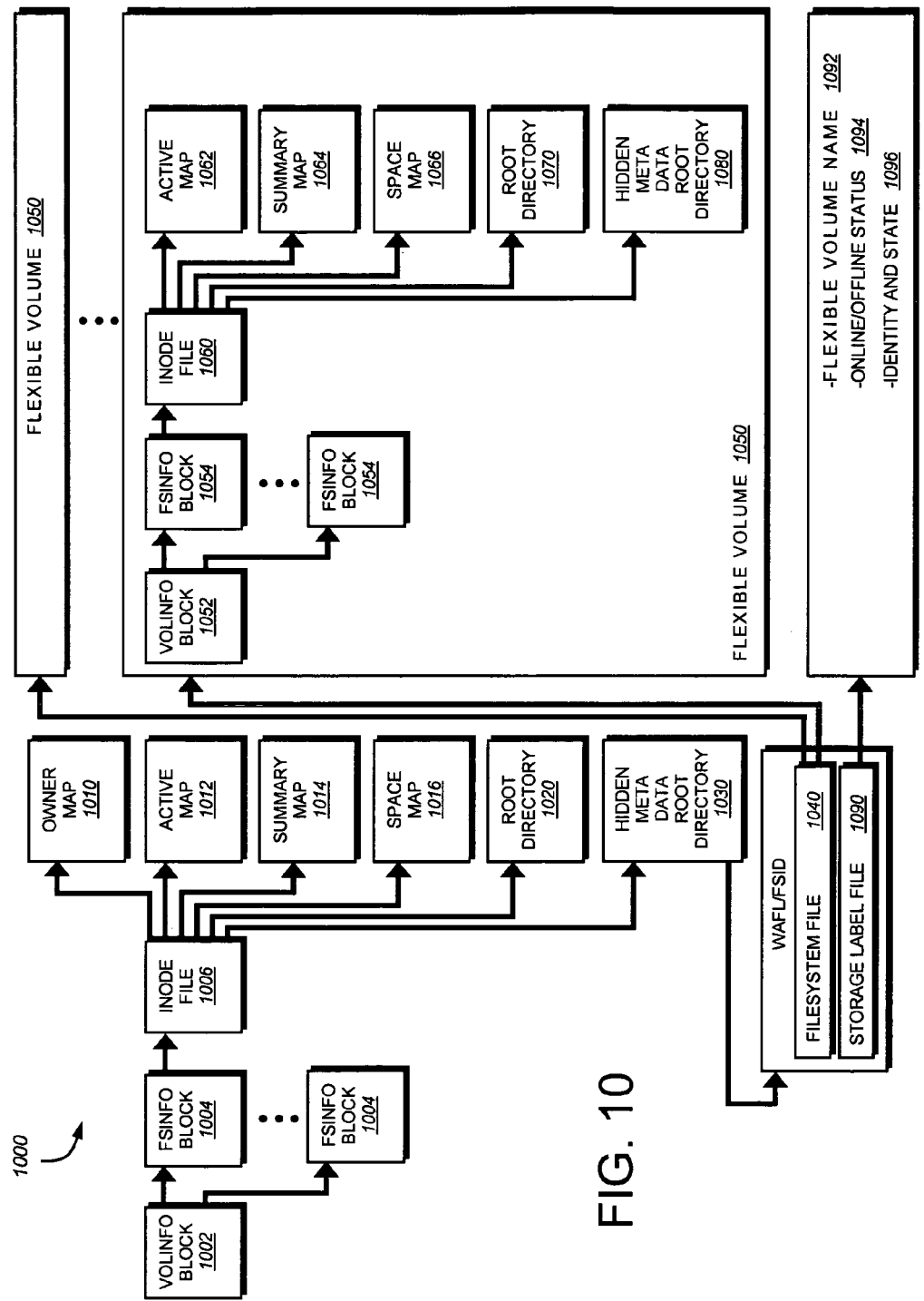
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

It should be noted that while this description is written in terms of aggregates and flexible volumes, the teachings of the present invention may be utilized with storage operating systems having any data format. As such, the description of aggregates and flexible volumes should be taken as exemplary only.

F. VLDB

Figure 11:
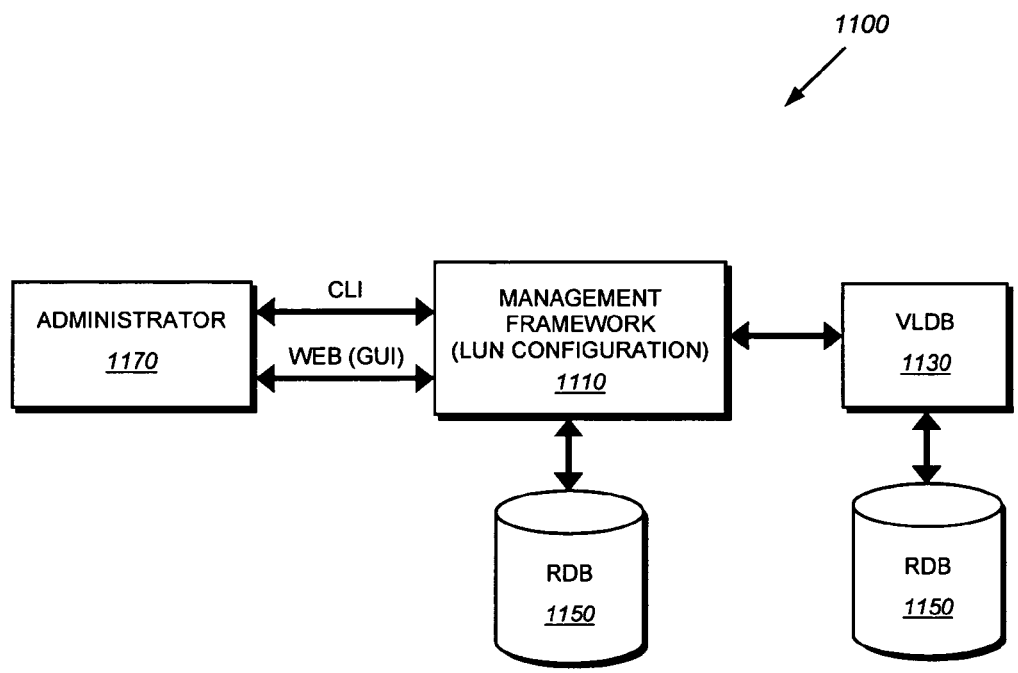
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110, and a volume location database (VLDB) process 1130, each utilizing a data replication service (RDB 1150) linked as a library. The management framework 1110 provides to an administrator 1170 a user interface via a command line interface (CLI) and/or a web-based graphical user interface (GUI).

These applications 1100 illustratively operate in user mode to enable reconfiguration or re-initialization of any of the applications without requiring the complete re-initialization of the storage operating system, which would result in a loss of data access for some length of time while the storage operating system was initializing. However, it should be noted that in alternate embodiments, the management process/applications 1100 may execute in non-user mode, e.g., in kernel mode.

The management framework is illustratively based on a conventional common interface model (CIM) object manager that provides the entity to which users/system administrators interact with a node 200 in order to manage the cluster 100. The management framework 1110 implements various commands for configuring luns exported by the cluster. In accordance with the illustrative embodiment of the present invention, the management framework 1110 manages the configuration and distribution of lun configuration information, such as initiator data structures and/or lun data structures, described further below.

The VLDB 1130 is a database process that tracks the locations of various storage components (e.g., flexible volumes, aggregates, etc.) within the cluster 100 to thereby facilitate routing of requests throughout the cluster. In the illustrative embodiment, the N-module 310 of each node accesses a configuration table 235 that maps the volume ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster. Examples of such VLDB entries include a VLDB volume entry 1200 and a VLDB aggregate entry 1300.

Figure 12:
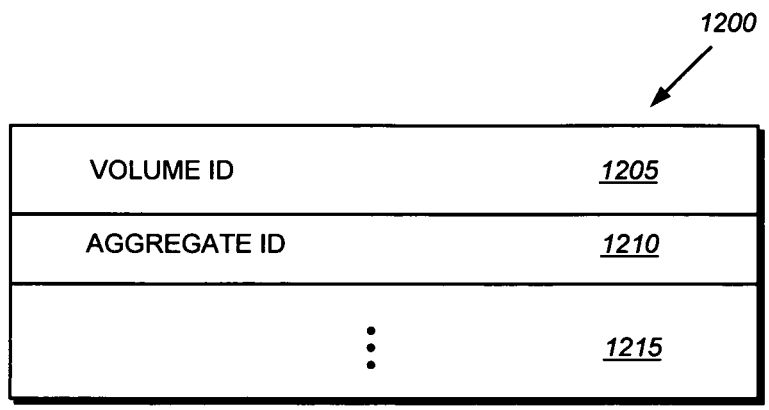
FIG. 12 is a schematic block diagram of a volume location database (VLDB) volume entry in accordance with an embodiment of the present invention.
Figure 13:
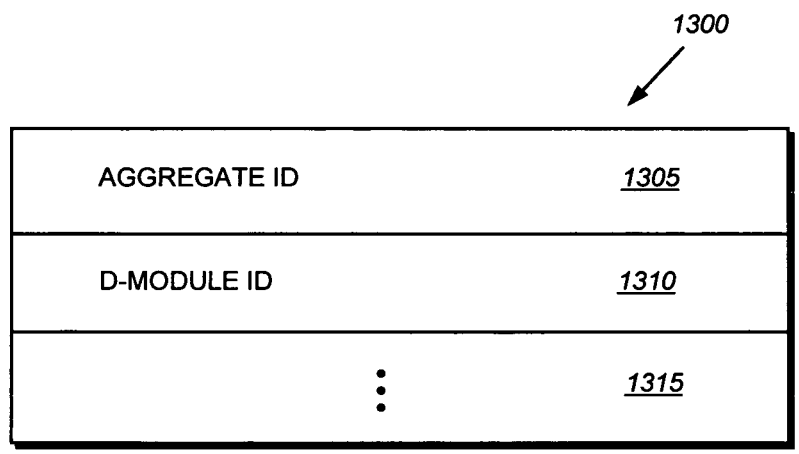
FIG. 13 is a schematic block diagram of a VLDB aggregate entry in accordance with an embodiment of the present invention.

FIG. 12 is a schematic block diagram of an exemplary VLDB volume entry 1200. The entry 1200 includes a volume ID field 1205, an aggregate ID field 1210 and, in alternate embodiments, additional fields 1215. The volume ID field 1205 contains an ID that identifies a volume 910 used in a volume location process. The aggregate ID field 1210 identifies the aggregate 900 containing the volume identified by the volume ID field 1205. Likewise, FIG. 13 is a schematic block diagram of an exemplary VLDB aggregate entry 1300. The entry 1300 includes an aggregate ID field 1305, a D-module ID field 1310 and, in alternate embodiments, additional fields 1315. The aggregate ID field 1305 contains an ID of a particular aggregate 900 in the cluster 100. The D-module ID field 1310 contains an ID of the D-module hosting the particular aggregate identified by the aggregate ID field 1305.

The VLDB illustratively implements a RPC interface, e.g., a Sun RPC interface, which allows the N-module 310 to query the VLDB 1130. When encountering contents of a data container handle 500 that are not stored in its configuration table, the N-module sends an RPC to the VLDB process. In response, the VLDB 1130 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 1100.

To that end, the management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database. Additionally, should an IP address ever be moved from one N-module to another, such modifications are stored within the RDB so that all elements of the cluster are able to determine the current cluster configuration. IP addresses may be moved from one N-module to another for a variety of reasons. An N-module may fail, which would result in an automatic failover of its IP addresses to other N-modules within the cluster. Alternately, an administrator may manually move and/or reassign IP addresses to, e.g., load balance, etc.

Also, as noted, the RDB maintains copies of lun data structures and initiator data structures so that each N-module of the cluster may share lun configuration information to enable all N-modules to present a unified iSCSI target in accordance with an embodiment of the present invention.

In the illustrative embodiment, the RDB is implemented as a distributed facility so that each node maintains a local copy of the data contained within the RDB. However, in alternate embodiments, the functionality of the RDB may be implemented in a non-distributed facility. For example, the M-module 170 may maintain a central database that must be queried by each N/D-module that desires access. Alternately, a single element (N/D-module) may be selected to maintain the RDB, with each other element (N/D-module) querying the identified element for access. The use of a distributed facility improves performance, but other techniques for enabling N/D-modules to have access to RDB's information may be utilized within the teachings of the present invention.

G. Lun Configuration

Figure 14:
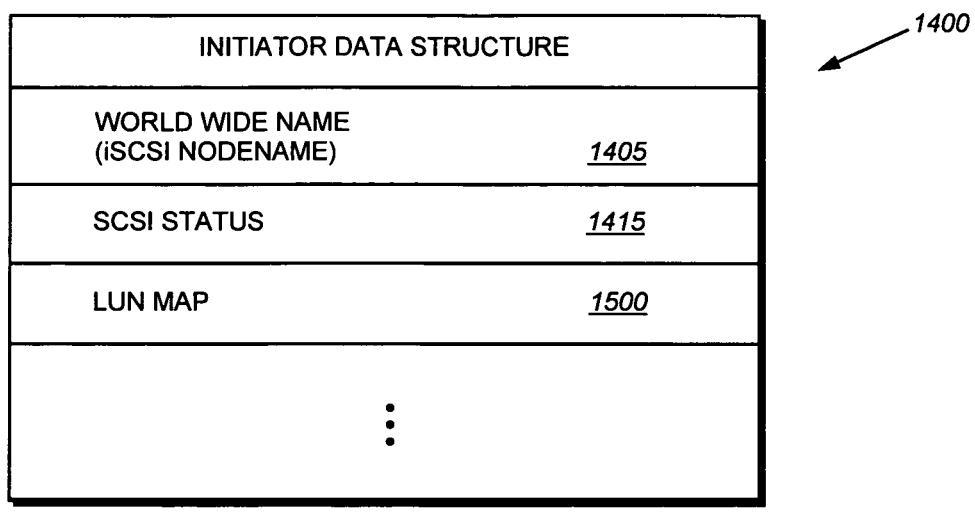
FIG. 14 is a schematic block diagram of an initiator data structure in accordance with an embodiment of the present invention.

As noted above, the SCSI target module 335 illustratively includes a set of initiator data structures 1400 as shown in FIG. 14. The initiator data structure 1400 is, in the illustrative embodiment, created when an initiator first connects to (e.g., establishes a session with) an N-module. Each initiator data structure is associated with a SCSI initiator (i.e., a client of the cluster). The N-module illustratively populates the various fields with data obtained during the connection stage or from an initiator data structure retrieved from the RDB as described further below. The initiator data structure 1400 includes various fields including, e.g., a world wide name (iSCSI Nodename) field 1405, a SCSI status field 1415 and a lun map 1500. It should be noted that in alternate embodiments the initiator data structure 1400 may have varying and/or differing fields from the illustrative embodiment. The world wide name field 1405 contains the unique name (e.g., iSCSI nodename) associated with the initiator. The SCSI status field 1415 contains various status information concerning the initiator's SCSI connection. The lun map 1500 contains a mapping of virtual luns (VLUNs) to physical lun (PLUNs). In the illustrative embodiment, the lun map 1500 is generated along with the initiator data structure 1400 when a client initially logs into the storage system if an initiator data structure is not available from the RDB. As described further below, each N-module generates an initiator data structure for each initiator when the initiator first connects to the N-module. The initiator data structures are illustratively distributed via the RDB so that modifications may be seen by all N-modules within the cluster. The RDB alerts each N-module of a change, which causes the N-module to retrieve the changed information from the RDB and update its local configuration. That is, in the illustrative embodiment, once any N-module (or D-module) updates its local copy of the RDB, the RDB mechanism will each other instantiation of RDB within the cluster to retrieve the updated information. It should be noted that in other embodiments, any distributed database implementation may be utilized with the RDB. As such, the implementation described herein should be taken as exemplary only.

Figure 15:
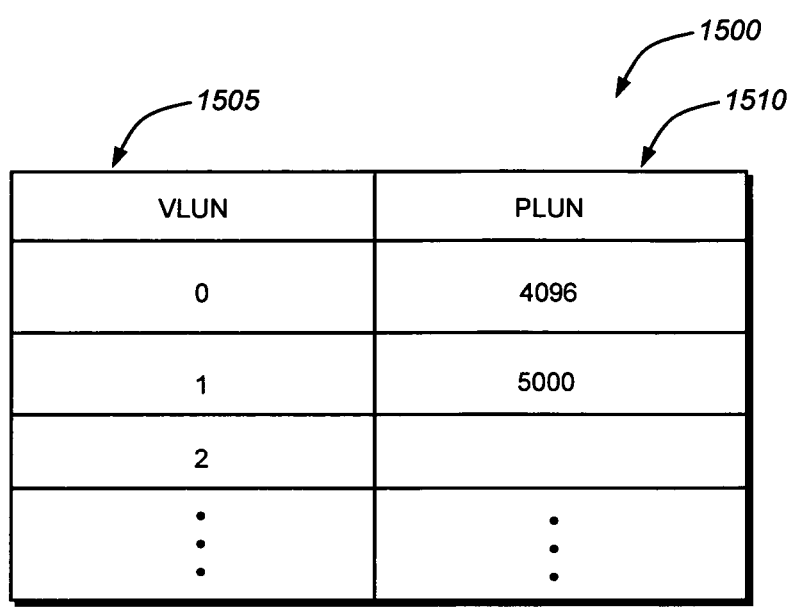
FIG. 15 is a schematic block diagram of a lun map in accordance with an embodiment of the present invention.

An exemplary lun map 1500, shown in FIG. 15, maps VLUNs to PLUNs. A VLUN is a lun returned to a SCSI initiator in a storage system environment. An initiator may be assigned a set of VLUNs starting from zero and progressing up to the number of luns that the initiator is connected thereto. Conversely, a PLUN is an actual lun associated with a vdisk managed by the storage system. As an intermediary between clients (initiators) and vdisks (luns) the storage system typically manages a larger set of luns than the set that is visible to an initiator.

The N-module utilizes the LUN map 1500 to translate a VLUN from a SCSI initiator to the appropriate PLUN. The lun map 1500 has, in the exemplary embodiment, two columns. The first column, VLUN 1505 identifies the virtual logical unit number that a SCSI initiator may access. In one embodiment of the present invention, each SCSI initiator attached to the cluster has its own lun address space. The second column comprises of PLUNs 1510 that are mapped to corresponding VLUNs 1505. Thus, in the example shown in FIG. 15, VLUN 0 is mapped to PLUN 4096. Similarly VLUN 1 is mapped to PLUN 5000. The use of VLUN to PLUN mapping enables each SCSI initiator to address a specific device with an initiator-specific lun value, i.e. a VLUN. If a lun value is not exported to a client, the PLUN value associated with the VLUN entry in the lun map 1500 is empty. For example, VLUN 2 is not mapped to any PLUN value. Thus, any data access request issued by the client and directed to VLUN 2 will result in an error.

Figure 16:
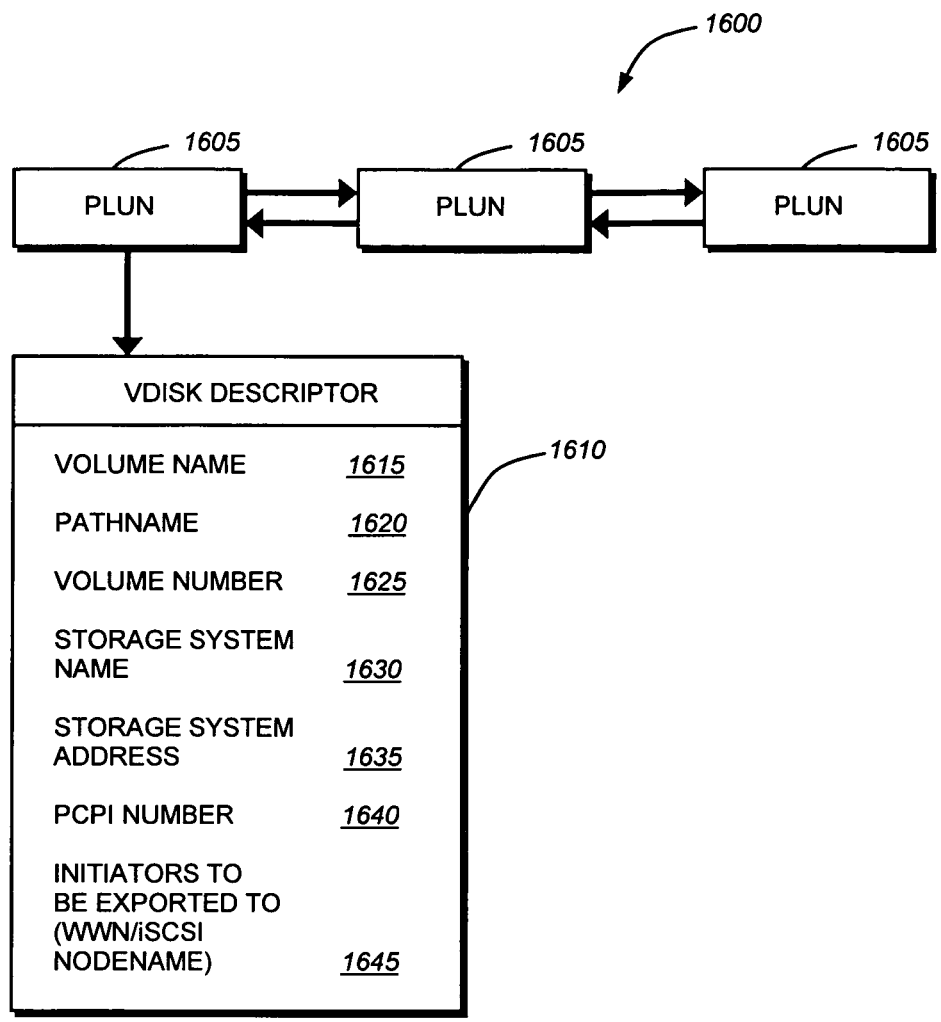
FIG. 16 is a schematic block diagram of a vdisk descriptor in accordance with an embodiment of the present invention.

FIG. 16 illustrates an exemplary set 1600 of linked lun data structures ("objects") 1605 maintained by the SCSI target module. Each lun data descriptor object 1605 contains various information associated with a vdisk embodied as a PLUN. This information is used by the cluster to manage the vdisk. Each PLUN data descriptor object 1605 also, illustratively, includes a vdisk descriptor 1610.

Each vdisk (lun) managed by the cluster has an associated vdisk descriptor 1610 that includes various data fields for information pertaining to the vdisk. These fields include volume name 1615, path name 1620, volume number 1625, storage system name 1630, storage system address 1635, PCPI number 1640 and a list of initiators (e.g. iSCSI nodenames) 1645 to which the lun is to be exported. It should be noted that the fields described herein are exemplary only in that additional and/or differing fields may be utilized in accordance with various embodiments of the invention. For example, the volume name 1615 field identifies the volume containing the vdisk. The path name field 1620 describes a path on the volume identified in the volume name 1615 field to the file containing the vdisk. Thus if the storage system name stored in field 1630 is "System5", the volume name stored in field 1615 is "vol0" and the path name stored in field 1620 field is "/vdisks/vdisk," then the vdisk identified by vdisk descriptor 1610 may be uniquely identified by the fully qualified path "System5:/vol0/vdisks/vdisk." The list of WWNs 1645 stores the WWNs and/or iSCSI names of clients (initiators) to which the lun is to be exported and that may access the lun. The list of WWNs 1645 may be set by an administrator when the vdisk is initially created.

H. Providing a Unified iSCSI Target

The present invention is directed to a system and method for configuring a cluster of interconnected storage systems on an iSCSI unified target. Illustratively, each storage system of the cluster comprises one or more network elements (N-module) and disk elements (D-module) operatively interconnected by a cluster switching fabric. The present invention permits the cluster to be presented to an initiator (client) as an iSCSI target by enabling each N-module to function as one of a plurality of "front ends" of the iSCSI target. As a front-end, any N-module may cooperate with a client to open (establish) one or more iSCSI sessions and thereafter receive data access requests directed to luns exported to that initiator. A data access request received by an N-module is processed by that N-module. As part of the processing, the N-module may send one or more requests to one or more D-modules. As used herein, a "front end" comprises a computer or other device to which one or more iSCSI connections terminate.

A management module (M-module) is operatively interconnected with the cluster to provide a set of user interface tools that enable an administrator to create appropriate lun maps, create and/or destroy luns and to perform other lun management functions. A replicated database (RDB) executes as a user application on each storage system and interfaces with a lun configuration process to centralize configuration of luns within the cluster. Modifications to the lun configuration are stored within the RDB. The RDB alerts each N-module of a change, which causes the N-module to retrieve the changed information from the RDB and update its local configuration.

Figure 17:
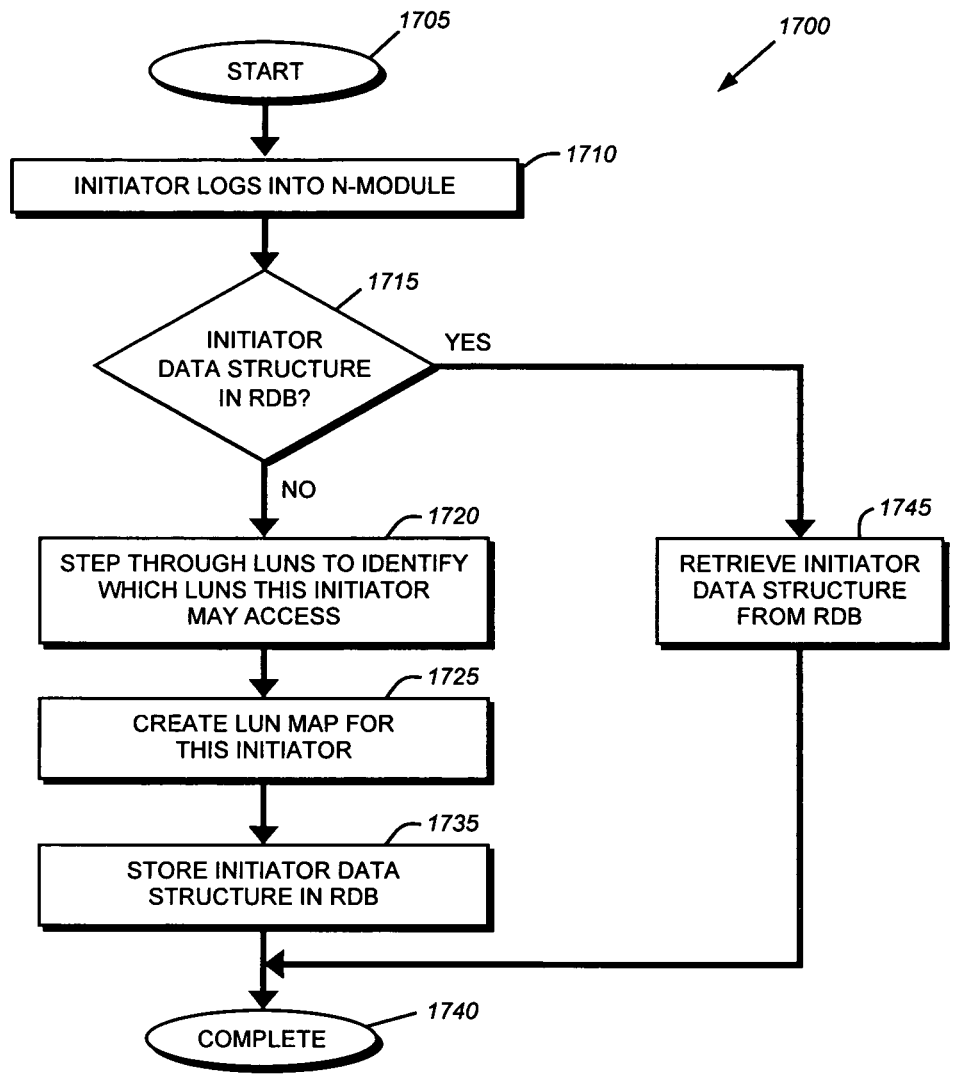
FIG. 17 is a flowchart detailing the steps of a procedure for associating an initiator data structure with an initiator while logging into a N-module in accordance with an embodiment of the present invention.

FIG. 17 is a flowchart of the steps of a procedure 1700 for creating a lun map in accordance with an embodiment of the present invention. The procedure 1700 initially begins in step 1705 and then proceeds to step 1710 where, the initiator performs an iSCSI login sequence and establishes an iSCSI session with the N-module. In step 1715, the N-module then determines if an initiator data structure associated with this initiator exists in the RDB. This determination may be made by searching the RDB database to determine if there is a current initiator data structure associated with the initiator. An initiator data structure may exist in the RDB if the initiator had previously logged into another N-module of the cluster. If there is an appropriate initiator data structure available from the RDB, the N-module retrieves the initiator data structure from the RDB in step 1745.

If the appropriate initiator data structure is not available from the RDB, the N-module creates an initiator data structure for storage within the RDB. To that end, the N-module walks through each of the linked lun data structures 1605 associated with the storage system to identify the PLUNs that the initiator may access. This may be accomplished, by example, by searching for the initiator's WWN in the list of WWNs to be exported field 1645 of each of the lun descriptor objects 1605. After the list of PLUNs that are accessible to the initiator has been identified, the N-module, in step 1725, creates a lun map 1500 for this initiator that associates those PLUNs to VLUNs and incorporates the map into an initiator data structure associated with the initiator. Note that the lun map identifies the mappings of the virtual luns to be exported to the initiator with the physical luns associated with the storage system. The N-module then stores the newly created initiator data structure in the RDB in step 1735. Storage of the initiators data structure in the RDB ensures that all N-modules share common information stored within data structure to enable proper lun management. Although the initiator data structure is not visible to other N-modules, if the initiator logs into another N-module of the cluster, the N-module may retrieve the initiator data structure from the RDB without having to generate a new initiator data structure.

Once logged into the storage system, the initiator may issue SCSI commands to any of its exported luns. Upon receipt of one of these SCSI commands, the storage system first must determine if the initiator is permitted to access the lun identified in the SCSI command. This ensures that only those initiators with the proper security permissions may access the data stored on a lun.

Figure 18:
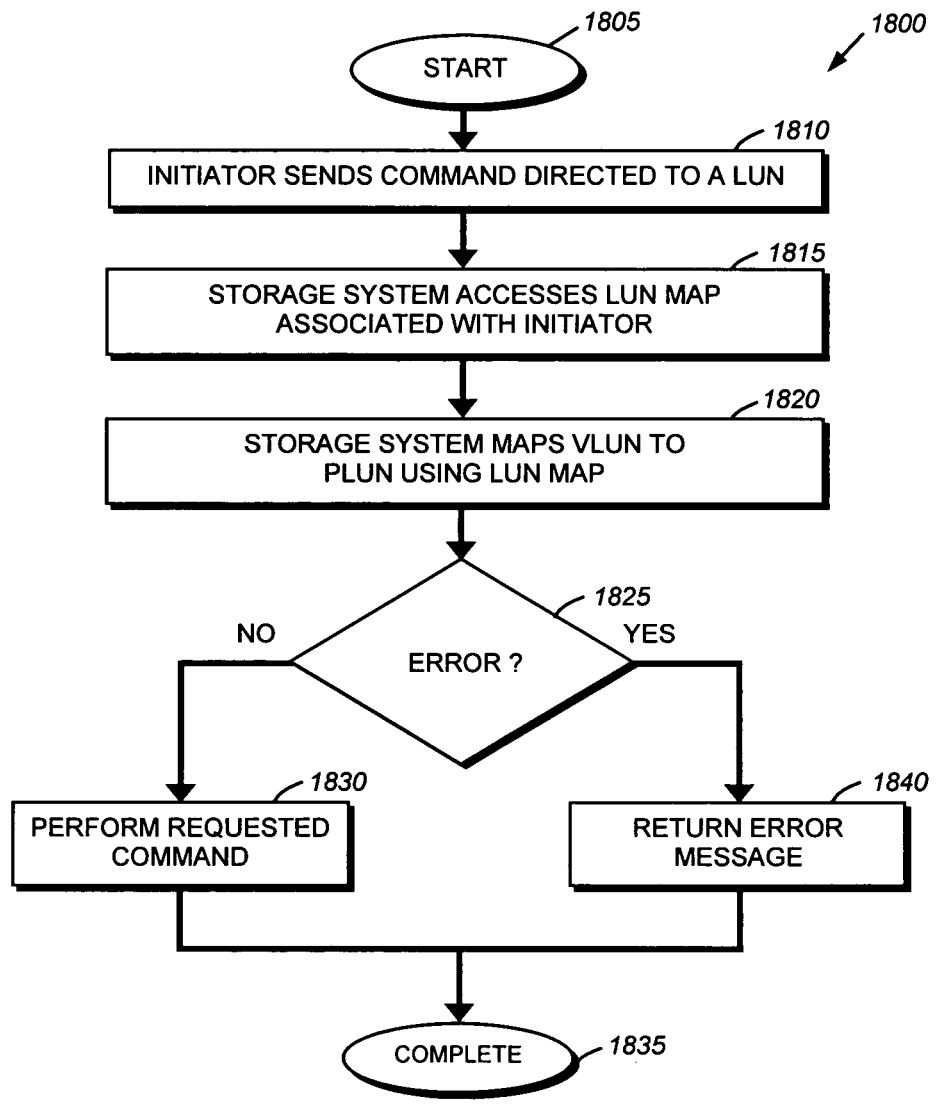
FIG. 18 is a flowchart detailing the steps of a procedure for processing a data access request in accordance with an embodiment the present invention.

The steps of an illustrative procedure 1800 for determining whether an initiator can access a lun are shown in FIG. 18. The procedure 1800 starts in step 1805 and then proceeds to step 1810 where an initiator sends a command directed to a lun associated with a storage system. The initiator uses a lun value associated with its VLUN value that represents the desired lun/vdisk. The storage system then accesses the lun map 1500 associated with the initiator in step 1815. In the illustrative embodiment, lun map 1500 is located within the initiator data block 1400 that is associated with the initiator. In step 1820, the storage system maps the VLUN to a PLUN using the lun map. In step 1825, the storage system then checks whether an error occurred during the mapping process. If no error occurred, then the storage system performs the requested command directed to the lun identified in the PLUN entry associated with the VLUN received from the initiator and the procedure completes in step 1835. If, however, an error has occurred in step 1825, the procedure then branches to step 1840 where an error message is returned. For example, an error could occur if the initiator attempts to access a VLUN that is not mapped to a PLUN on the storage system. Referring to the lun map 1500 shown in FIG. 15, assume the VLUN 2 is not exported to a client since there is no corresponding PLUN value within the lun map 1500. In such a situation, an attempt by the initiator to access lun number 2 will result in an error message being returned. By utilizing the above-described lun masking technique, the storage system only needs to perform a single lookup of data, namely identifying the VLUN sent by the initiator and its associated PLUN in the lun map. The procedure then completes in step 1835.

Figure 19:
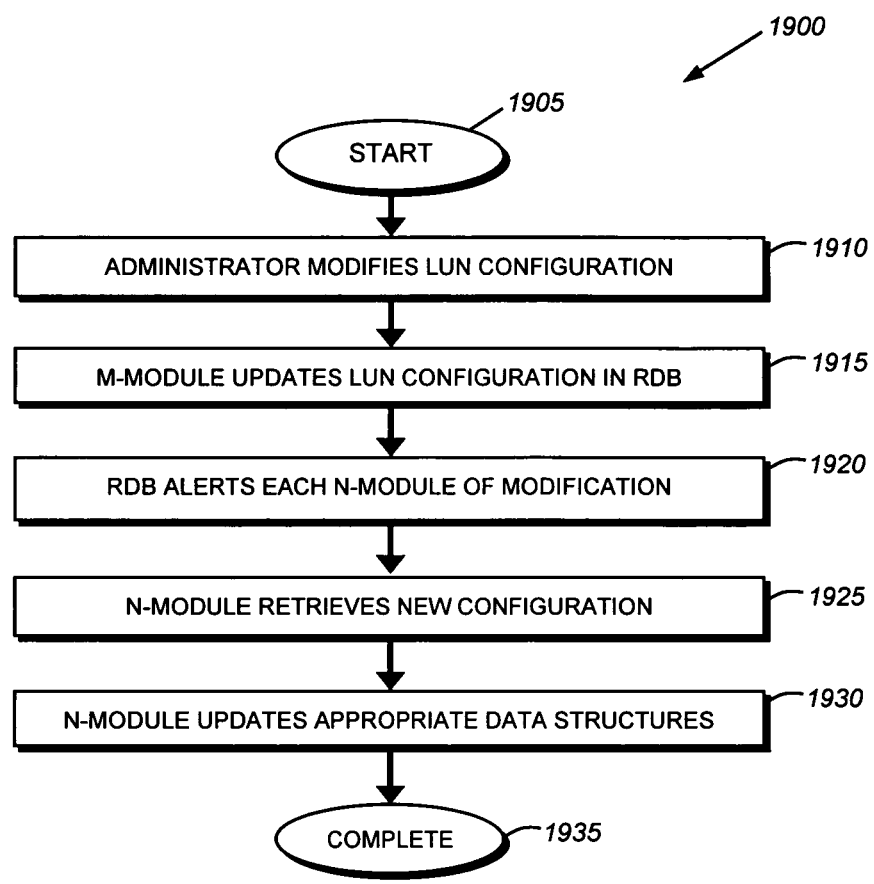
FIG. 19 is a flowchart detailing the steps of a procedure for updating a lun configuration in accordance with an embodiment of the present invention.

FIG. 19 is a flowchart detailing the steps of a procedure 1900 for updating lun configuration information in accordance with an embodiment the present invention. The procedure 1900 begins in step 1905 and continues to step 1910 where an administrator modifies the lun configuration. The lun configuration modification may include, e.g., changes to of lun maps, the creation/destruction of luns, etc. In response, the M-module updates the lun configuration stored within the RDB in step 1915. The RDB alerts each N-module of the modification to the lun configuration in step 1920. This alert may be accomplished using, for example a RPC or other form of inter-process communication. In response, the N-module retrieves the new configuration from the RDB in step 1925. The N-module updates the appropriate data configuration in step 1930. The procedure then completes in step 1935. Thus, the RDB utilizes a push technique for distributing changes to the lun configuration to each N-module.

Figure 20:
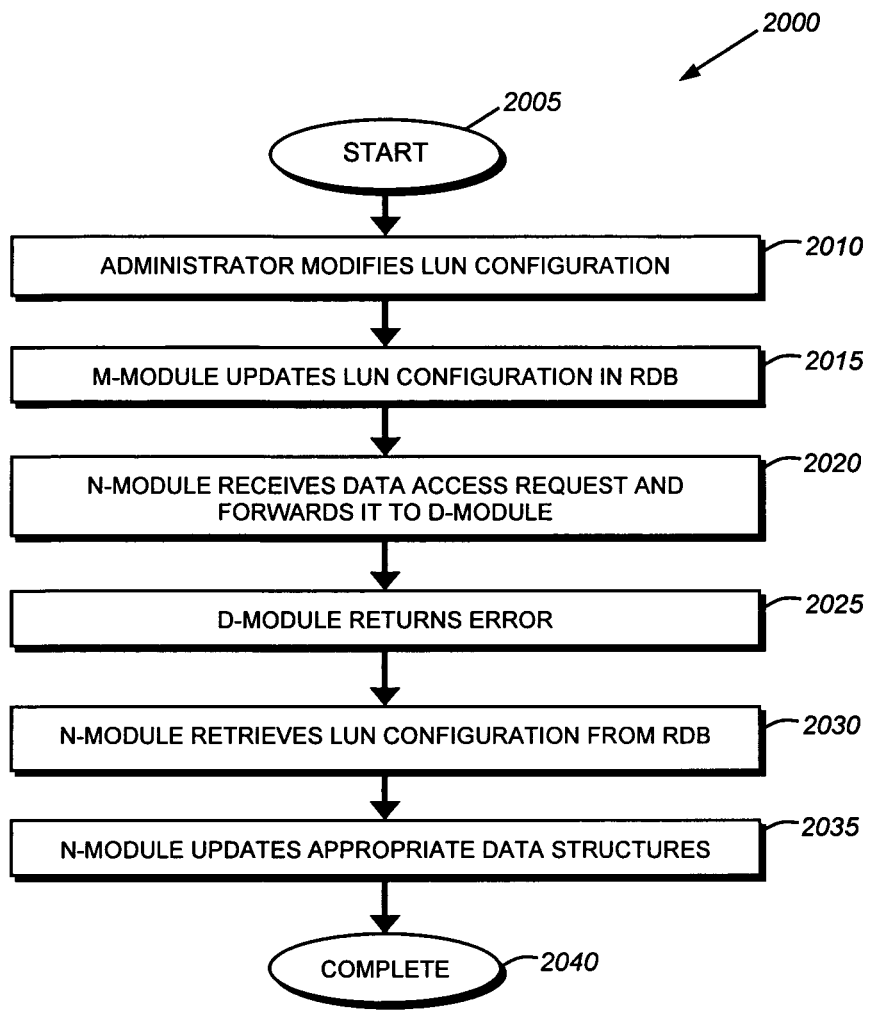
FIG. 20 is a flowchart detailing the steps of a procedure for updating lun configuration in accordance with an embodiment the present invention.

FIG. 20 is a flowchart detailing the steps of a procedure 200 for updating lun configuration in accordance with an alternate embodiment of the present invention. The procedure 2000 begins in step 2005 and continues to step 2010 where the administrator modifies the lun configuration of the cluster. In response, the M-module updates the lun configuration in the RDB in step 2015. Subsequently, a N-module receives a data access request and forwards the request to a D-module in step 2020. The D-module returns an error in step 2025 wherein the error may be caused by, for example, an attempt to access a lun that does not exist or one that has been removed. In response to receiving the error, the N-module retrieves new lun configuration information from the RDB in step 2030 before updating its appropriate data structures in step 2035. The procedure then completes in step 2040.

A noted advantage of the present invention is that the lun configuration information is visible to each N-module so that the cluster is presented as an iSCSI target with each of the N-modules comprising an independent front end to the cluster. To that end, changes in lun configurations are propagated to each N-module.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A computer system for providing one or more sessions of a block-based protocol, comprising: a plurality of storage systems configured for organization in a cluster, wherein at least one storage system of the plurality of storage systems is configured to execute a storage operating system and the at least one storage system includes one or more network elements connected to one or more storage device elements, and wherein the plurality of storage systems is configured to support the one or more sessions of the protocol to an initiator; a centralized database operatively interconnected to the plurality of storage systems and configured to store logical unit number configuration information of the plurality of storage systems, wherein the database is further configured to alert each of the plurality of storage systems of the logical unit number configuration information, and wherein each of the storage systems includes an N-module configured to share the logical unit number configuration information with each of the plurality of storage systems; and the plurality of storage systems further configured to locally cache the shared logical unit number configuration information.

2. The system of claim 1 wherein the protocol comprises small systems computer interface (SCSI) encapsulated in transport control protocol/internet protocol (TCP/IP).

3. The system of claim 1 wherein the database comprises one or more logical unit number data structures.

4. The system of claim 1 wherein the database comprises one or more initiator data structures.

5. The system of claim 1 wherein upon login of the initiator, one or more of the plurality of storage systems is further configured to access the database to determine if an initiator data structure associated with the initiator is accessible.

6. The system of claim 5 wherein upon determining that the initiator data structure is not accessible from the database, the one or more of the plurality of storage systems is further configured to generate the initiator data structure.

7. The system of claim 6 wherein the initiator data structure is generated using information from one or more logical unit number data structures.

8. A method for providing one or more sessions of a block-based protocol, comprising: organizing a plurality of storage systems in a cluster, wherein at least one storage system of the plurality of storage systems is configured to execute a storage operating system; storing, by a centralized replicated database operatively connected to each storage system of the plurality of storage systems, a logical unit number configuration information of each storage system of the plurality of storage systems; alerting each other storage system in the cluster via the centralized replicated database of the logical unit number configuration information, wherein each of the storage systems includes an N-module configured to share the logical unit number configuration information with each other storage system in the cluster; logging into one of the storage systems by an initiator using the protocol; determining whether an initiator data structure associated with the initiator is available from the replicated database; in response to determining that the initiator data structure is not available from the replicated database, generating the initiator data structure; and storing the generated initiator data structure in the replicated database, wherein the initiator data structure is used to establish the one or more sessions.

9. The method of claim 8 wherein the protocol comprises small systems computer interface (SCSI) encapsulated in transport control protocol/internet protocol (TCP/IP).

10. The method of claim 8 wherein the replicated database comprises one or more logical unit number data structures.

11. The method of claim 8 further comprising:
in response to determining that the initiator data structure is available from the replicated database, retrieving the initiator data structure from the replicated database; and returning a list of accessible data containers to the initiator.

12. The method of claim 11 wherein one or more of the data containers comprise a logical unit number.

13. A computer data storage system, comprising: a plurality of storage systems organized in a cluster, at least one of the plurality of storage systems having a processor and a memory, the at least one storage system of the plurality of storage systems configured to execute a storage operating system; a centralized database operatively connected to each storage system of the plurality of storage systems, the centralized data base configured to store logical unit number configuration information of each storage system of the plurality of storage systems, the centralized database further configured to alert each other storage system in the cluster via the database of the logical unit number information; at least one storage system configured to support logging by an initiator using a protocol, the at least one storage system further configured to determine whether an initiator data structure associated with the initiator is available from the database; the at least one storage system further configured to generate, in response to determining that the initiator data structure is not available from the database, the initiator data structure; and the at least one storage system further configured to store the generated initiator data structure in the database, and the at least one storage system further configured to share the generated initiator data structure with each of the other storage systems.

14. The system of claim 13 wherein the protocol comprises small systems computer interface (SCSI) encapsulated in transport control protocol/internet protocol (TCP/IP).

15. The system of claim 13 wherein the database comprises one or more logical unit number data structures.

16. The system of claim 13 further comprising: in response to determining that the initiator data structure is available from the database, a second storage system of the plurality of storage systems configured to retrieve the initiator data structure from the database.

17. A non-transitory computer readable storage medium containing executable program instructions for execution by a processor, comprising: program instructions that organize a plurality of storage systems in a cluster, wherein at least one storage system of the plurality of storage systems is configured to execute a storage operating system; program instructions that store, by a centralized database operatively interconnected to each storage system of the plurality of storage systems, logical unit number configuration information of each storage system of the plurality of storage systems; program instructions that alert each other storage system in the cluster via the database of the logical unit number configuration information, wherein each of the storage systems includes an N-module configured to share the logical unit number configuration information with each other storage system in the cluster; program instructions that log into one of the storage systems by an initiator using a protocol; program instructions that determine whether an initiator data structure associated with the initiator is available from the database; program instructions that generate, in response to determining that the initiator data structure is not available from the database, the initiator data structure; and program instructions that store the generated initiator data structure in the database.

18. The non-transitory computer readable storage medium of claim 17 wherein the protocol comprises small systems computer interface (SCSI) encapsulated in transport control protocol/internet protocol (TCP/IP).

19. A computer data storage system, comprising: one or more network elements configured to execute a storage operating system; one or more storage device elements and the network elements organized into a cluster, each of the one or more network elements configured to present the cluster as a target to an initiator by centralizing a configuration of logical unit numbers within the cluster; one or more centralized databases configured to alert each other network element in the cluster of the centralized configuration of logical unit numbers, wherein each of the storage systems includes an N-module configured to share the centralized configuration of logical unit numbers with each other network element in the cluster; and wherein the initiator is configured to access all data containers exported to the initiator by the cluster by sending data access requests using a protocol to any of the one or more network elements.

20. The system of claim 19 wherein the protocol comprises small systems computer interface (SCSI) encapsulated in transport control protocol/internet protocol (TCP/IP).

21. The system of claim 19 wherein each of the network elements is operatively interconnected to a facility for storing data to be accessed by each of the network elements to enable the centralized configuration of logical unit numbers.

22. The system of claim 21 wherein the facility comprises a central database.

23. The system of claim 21 wherein the facility comprises a replicated database.

24. The system of claim 21 wherein the facility comprises one or more logical unit number data structures.

25. The system of claim 21 wherein the facility comprises one or more initiator data structures.

26. The system of claim 21 wherein upon login of the initiator, each of the network elements is further configured to access the facility to determine if an initiator data structure associated with the initiator is accessible.

27. The system of claim 26 wherein upon determining that the initiator data structure is not accessible from the facility, each of the network elements is further configured to generate the initiator data structure.

28. The system of claim 25 wherein the initiator data structure is generated using information from one or more logical unit number data structures.

29. A computer data storage system, comprising: at least one network element configured to execute a storage operating system, the at least one network element operatively connected with one or more storage device elements to form a cluster, wherein the cluster is configured to be presented as a unified target to an initiator by centralizing a configuration of data containers within the cluster, wherein at least one of the network elements in the cluster is further configured to operatively connect to the initiator, wherein each of the network elements in the cluster is further configured to receive the centralized configuration of data containers in the cluster in response to an alert via one or more centralized databases of the cluster, wherein each of the storage systems includes an N-module configured to share the centralized configuration information of data containers via at least one of the one or more centralized databases, and wherein each of the network elements in the cluster is configured to enable the initiator to access any data container exported to the initiator by the cluster by the initiator sending data access requests using a protocol to any of the one or more network elements in the cluster.

30. The system of claim 29 wherein the protocol comprises a small computer systems interface encapsulated in transport control protocol/internet protocol.

31. The computer system of claim 1, wherein a first storage system of the plurality of storage systems supports a first protocol session of the one or more protocol sessions to the initiator, wherein a second storage system of the plurality of storage system supports a second protocol session of the one or more protocol sessions to the initiator, and wherein the first protocol session and the second protocol session are directed toward a target.

32. The computer system of claim 1 wherein each of the plurality of storage systems retrieves the logical unit number configuration information from the centralized database.

* * * * *